US012398502B2

(12) United States Patent
Huang et al.

(10) Patent No.: US 12,398,502 B2
(45) Date of Patent: Aug. 26, 2025

(54) DISTRIBUTOR, WATER INTAKE SYSTEM, AND LAUNDRY TREATING DEVICE

(71) Applicant: WUXI LITTLE SWAN ELECTRIC CO., LTD., Wuxi (CN)

(72) Inventors: Shengye Huang, Wuxi (CN); Jinyang Zhang, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 287 days.

(21) Appl. No.: 18/025,907

(22) PCT Filed: Nov. 30, 2020

(86) PCT No.: PCT/CN2020/132677
§ 371 (c)(1),
(2) Date: Mar. 12, 2023

(87) PCT Pub. No.: WO2022/052330
PCT Pub. Date: Mar. 17, 2022

(65) Prior Publication Data
US 2024/0003075 A1    Jan. 4, 2024

(30) Foreign Application Priority Data
Sep. 11, 2020 (CN) .......................... 202010955169.8

(51) Int. Cl.
*D06F 39/08* (2006.01)
*D06F 39/02* (2006.01)

(52) U.S. Cl.
CPC .......... *D06F 39/088* (2013.01); *D06F 39/028* (2013.01)

(58) Field of Classification Search
None
See application file for complete search history.

(56) References Cited

U.S. PATENT DOCUMENTS

| 2005/0252251 A1 | 11/2005 | Rizzetto |
| 2005/0262881 A1 | 12/2005 | Rizzetto |
| 2012/0096903 A1* | 4/2012 | Kim ........................ D06F 39/02 68/17 R |

FOREIGN PATENT DOCUMENTS

| CN | 2830467 | 10/2006 |
| CN | 101191298 A | 6/2008 |

(Continued)

OTHER PUBLICATIONS

CN 108315966 A, A Water Box Component and Washing Machine, Lv (Year: 2018).*

(Continued)

*Primary Examiner* — Cristi J Tate-Sims
(74) *Attorney, Agent, or Firm* — K&L Gates LLP

(57) ABSTRACT

A distributor, a water intake system, and a laundry treating device. The distributor includes a base, the base including a water accommodating portion which is used to define a water flow boundary, and an insertion portion being formed at an upper end of the water accommodating portion; a cover plate, a fitting slot being formed in the cover plate, and the insertion portion being limited in the fitting slot; and a fastener, the fastener connecting the cover plate to the base in a fastening manner, and to form sealing faces, which are in close contact, between the insertion portion and the fitting slot. The base and the cover plate of the distributor are connected by means of the fastener. Under the fastening action of the fastener.

11 Claims, 7 Drawing Sheets

(56) References Cited

FOREIGN PATENT DOCUMENTS

| | | | |
|---|---|---|---|
| CN | 101191301 A | 6/2008 | |
| CN | 206090095 U | 4/2017 | |
| CN | 108315966 A * | 7/2018 | ............. D06F 39/02 |
| CN | 108842379 A | 11/2018 | |
| CN | 109898284 A | 6/2019 | |
| CN | 110359238 A | 10/2019 | |
| CN | 209555572 U | 10/2019 | |
| CN | 111101346 A | 5/2020 | |
| EP | 2078779 A1 * | 7/2009 | ............. D06F 39/02 |
| GB | 2353540 A | 2/2001 | |
| KR | 20080087363 A | 10/2008 | |

OTHER PUBLICATIONS

ISR mailed Jun. 9, 2021 for PCT No. PCT/CN2020/132677.
Written Opinion received in PCT/CN2020/132677; mailed on Jun. 9, 2021.
First Office Action received in CN Application No. 202010955169.8; mailed Jun. 27, 2022.
Second Office Action in CN Application No. 202010955169.8; mailed Nov. 24, 2022.

* cited by examiner

DISTRIBUTOR, WATER INTAKE SYSTEM, AND LAUNDRY TREATING DEVICE

CROSS-REFERENCES TO RELATED APPLICATIONS

The present disclosure is a national phase application of International Application No. PCT/CN2020/132677, filed on Nov. 30, 2020, which claims priority to Chinese Patent Application No. 202010955169.8, filed Sep. 11, 2020, the entireties of which are herein incorporated by reference.

FIELD

The present disclosure relates to the field of household appliances, and in particular to a dispenser, a water inlet system and a laundry treating device.

BACKGROUND

This section provides only background information relevant to the present disclosure, and is not necessarily the related art.

A water inlet system of a laundry treating device, such as a washing machine, a washing and drying machine, etc., is generally used to distribute the public tap water, and configured to allow the tap water to flow into different detergent dispensers, and allow the washing agents in the different detergent dispensers to be flushed into a washing drum of the laundry treating device. A dispenser is one of the main devices in the water inlet system, and the process for distributing the tap water is realized through the dispenser. In the related art, the dispenser is mainly composed of a base and a cover plate. The cover plate and the base are connected with each other and collectively define a flow channel for passage of water flow. During the passage of water flow, the flow channel is subjected to a level of water pressure. In order to ensure the sealing performance of the flow channel, the cover plate and the base are usually connected with each other by welding, resulting in higher cost and lower production efficiency.

SUMMARY

The present disclosure aims at least to solve the problem that the existing dispenser being assembled by welding results in higher cost and lower production efficiency. The aim is achieved by the embodiments as follows.

An embodiment of the present disclosure proposes a dispenser. The dispenser includes: a base, in which the base includes a water storing part configured to define a water flow boundary, an insertion part being formed at an upper end of the water storing part; a cover plate, in which a fitting slot is formed on the cover plate, the insertion part being limited in the fitting slot; and a fastener, in which the fastener fastens the cover plate to the base to enable sealing surfaces to be formed between the insertion part and the fitting slot, the sealing surfaces being in close contact with each other.

According to the dispenser in the embodiment of the present disclosure, the base of the dispenser is connected to the cover plate of the dispenser through the fastener, and the water storing part on the base is configured to define the water flow boundary. In a case that the base is connected to the cover plate, the water storing part and the cover plate collectively define a water flow channel. Meanwhile, under the fastening action of the fastener, the insertion part formed at the upper end of the water storing part fits tightly into the fitting slot formed on the cover plate, and sealing surfaces, which are in close contact with each other, are formed between the insertion part and the fitting slot, to guarantee the sealing performance of the water flow channel. Since the base is connected to the cover plate by means of locking through the fastener, and meanwhile the channel is sealed, the cost can be reduced, and the production efficiency is relatively high compared to the welding method used in the related art.

In addition, the dispenser in the embodiment of the present disclosure may further include the additional embodiments as follows.

In some embodiments of the present disclosure, a bottom portion of the fitting slot is provided with a narrowed section. Under a fastening action of the fastener, an end of the insertion part abuts tightly against inner walls of the narrowed section to form a first sealing surface and a second sealing surface.

In some embodiments of the present disclosure, a protrusion is formed at the bottom portion of the fitting slot. Under the fastening action of the fastener, the end of the insertion part abuts tightly against the protrusion to form a third sealing surface.

In some embodiments of the present disclosure, a first inclined surface is formed on the insertion part, and a second inclined surface is formed on an inner wall of the fitting slot. Under the fastening action of the fastener, the first inclined surface abuts tightly against the second inclined surface to form a fourth sealing surface.

In some embodiments of the present disclosure, the water storing part includes a flow channel assembly, and a spray chamber connected to the flow channel assembly. Water outlet holes are formed at a bottom part of the spray chamber.

In some embodiments of the present disclosure, the flow channel assembly includes: a X-shaped flow channel, in which the X-shaped flow channel includes a first flow channel and a second flow channel intersecting with the first flow channel, in which the first flow channel includes a first water inlet section and a first water outlet section, and the second flow channel includes a second water inlet section and a second water outlet section; and a third flow channel, in which the third flow channel is arranged between the first water outlet section and the second water outlet section, the third flow channel is in communication with the X-shaped flow channel, an inlet of the third flow channel is arranged at an intersection of the first flow channel with the second flow channel, and the spray chamber is in communication with the third flow channel.

In some embodiments of the present disclosure, the dispenser further includes: a first water inlet joint arranged at an inlet of the first flow channel; a second water inlet joint arranged at an inlet of the second flow channel; a first water outlet joint arranged at an outlet of the first flow channel; and a second water outlet joint arranged at an outlet of the second flow channel.

In some embodiments of the present disclosure, the dispenser further includes a hot water pipe joint arranged on the cover plate. The hot water pipe joint is in communication with the spray chamber.

In some embodiments of the present disclosure, the base further includes a receiving tray. The receiving tray is arranged around the flow channel assembly, and the receiving tray is provided with water leakage holes.

In some embodiments of the present disclosure, the dispenser further includes a snap assembly arranged between the base and the cover plate.

An embodiment of the present disclosure proposes a water inlet system, which includes the dispenser in any one of the above embodiments.

According to the water inlet system in the embodiment of the present disclosure, the base of the dispenser of the water inlet system is connected to the cover plate of the dispenser of the water inlet system through the fastener, and the water storing part on the base is configured to define the water flow boundary. In a case that the base is connected to the cover plate, the water storing part and the cover plate collectively define a water flow channel. Meanwhile, under the fastening action of the fastener, the insertion part formed at the upper end of the water storing part fits tightly into the fitting slot formed on the cover plate, and sealing surfaces, which are in close contact with each other, are formed between the insertion part and the fitting slot, to guarantee the sealing performance of the water flow channel. Since the base is connected to the cover plate by means of locking through the fastener, and meanwhile the channel is sealed, the cost can be reduced, and the production efficiency is relatively high compared to the welding method used in the related art.

An embodiment of the present disclosure proposes a laundry treating device, which includes the water inlet system in any one of the above embodiments.

According to the laundry treating device in the embodiment of the present disclosure, the water inlet system of the laundry treating device includes a dispenser. The base of the dispenser is connected to the cover plate of the dispenser through the fastener, and the water storing part on the base is configured to define the water flow boundary. In a case that the base is connected to the cover plate, the water storing part and the cover plate collectively define a water flow channel. Meanwhile, under the fastening action of the fastener, the insertion part formed at the upper end of the water storing part fits tightly into the fitting slot formed on the cover plate, and sealing surfaces, which are in close contact with each other, are formed between the insertion part and the fitting slot, to guarantee the sealing performance of the water flow channel. Since the base is connected to the cover plate by means of locking through the fastener, and meanwhile the channel is sealed, the cost can be reduced, and the production efficiency is relatively high compared to the welding method used in the related art.

BRIEF DESCRIPTION OF THE DRAWINGS

The embodiments of the present disclosure will become apparent and more readily appreciated from the following description of the embodiments made with reference to the drawings, in which.

LIST OF REFERENCE SYMBOLS

Figure 1:
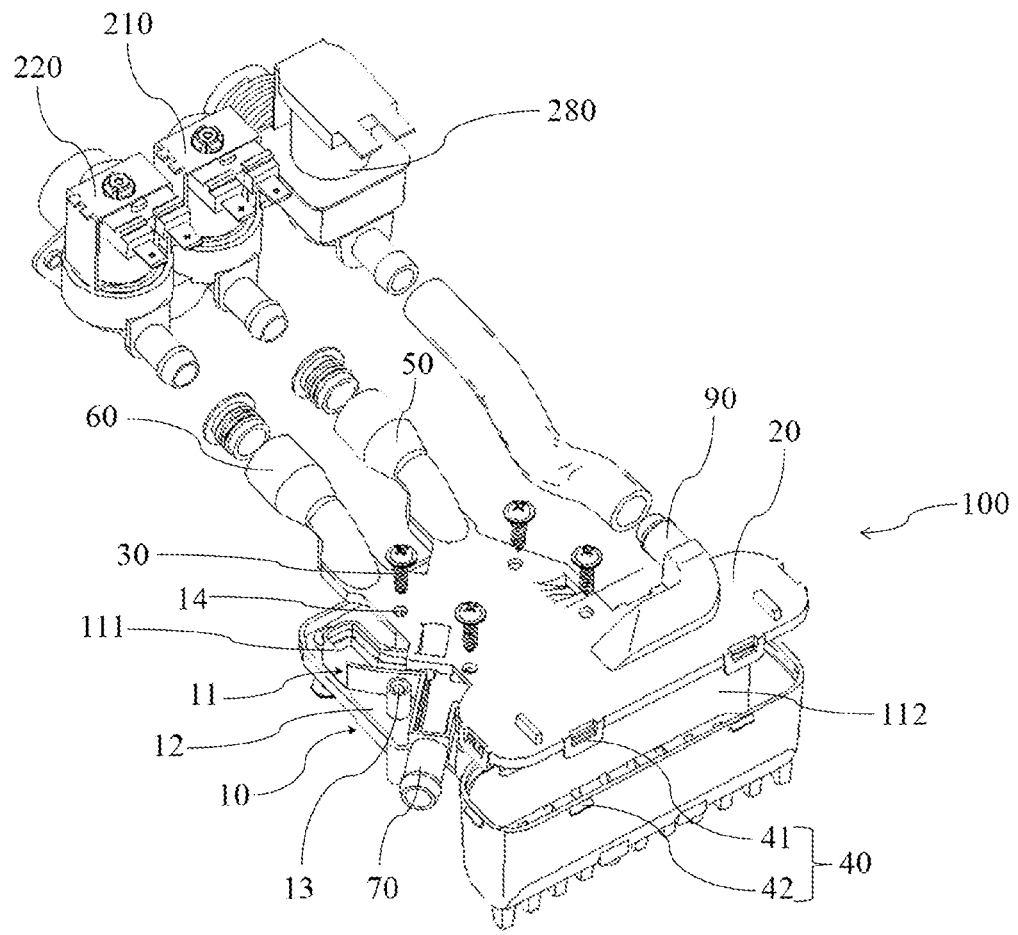
FIG. 1 is a schematic view of a dispenser according to an embodiment of the present disclosure.
Figure 2:
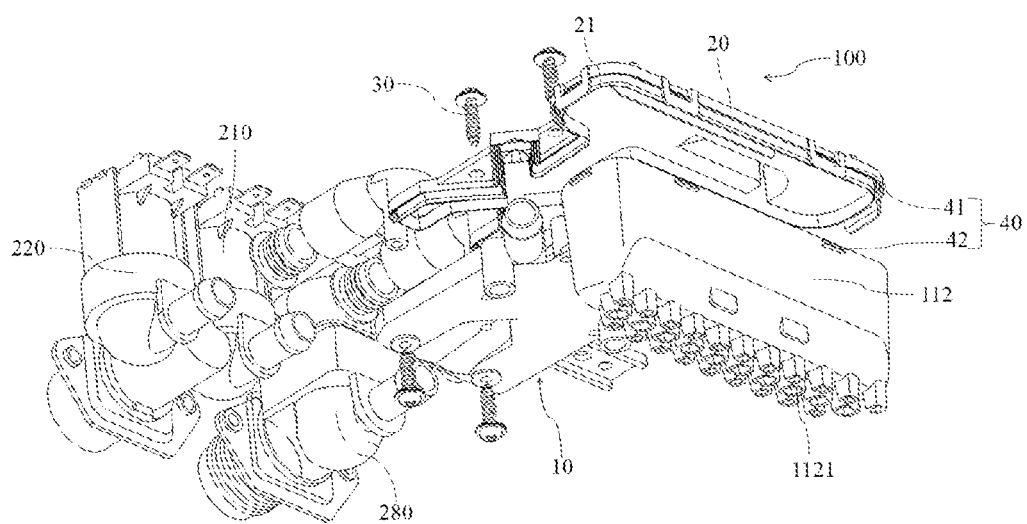
FIG. 2 is a schematic view of a dispenser according to an embodiment of the present disclosure in another angle of view.
Figure 3:
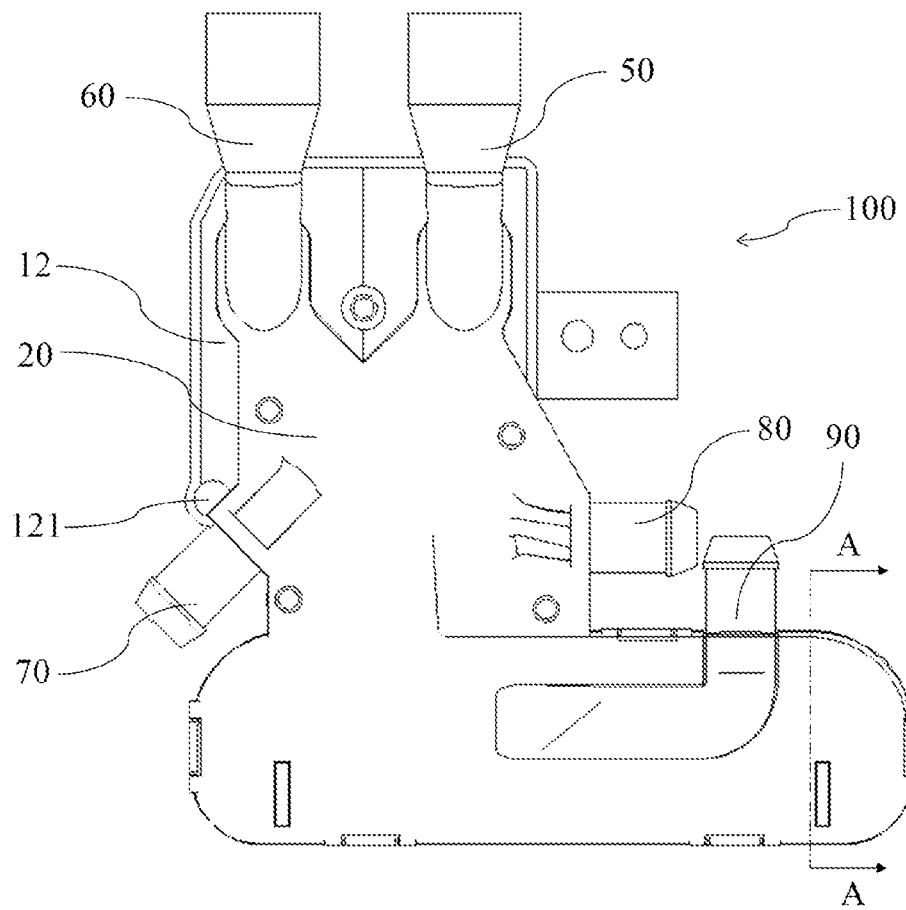
FIG. 3 is a schematic top view of a dispenser according to an embodiment of the present disclosure.
Figure 4:
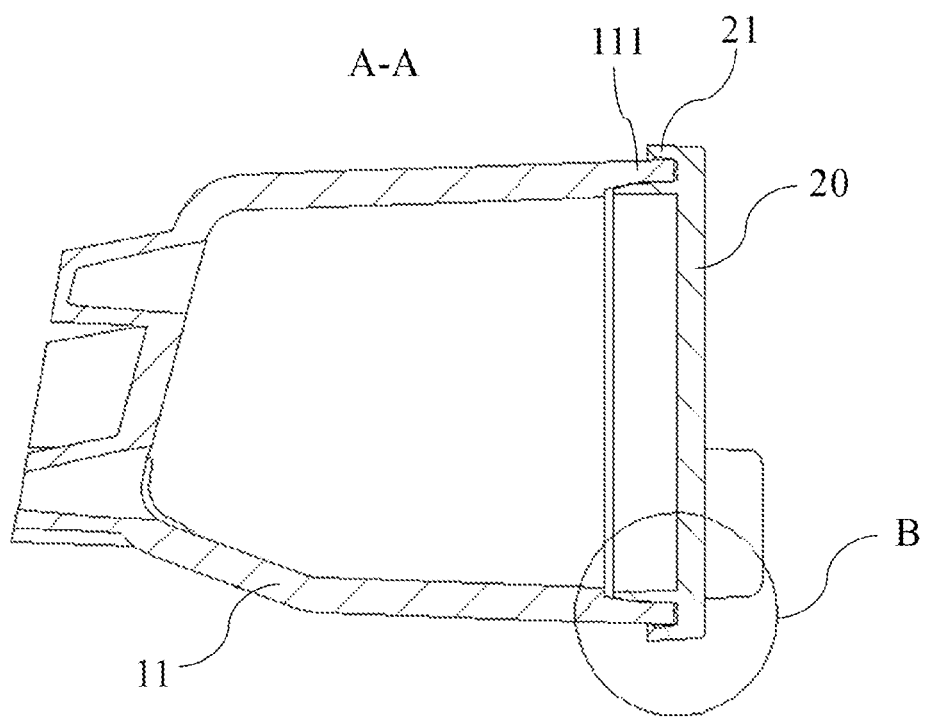
FIG. 4 is a schematic sectional view taken along a A-A direction in FIG. 3.
Figure 5:
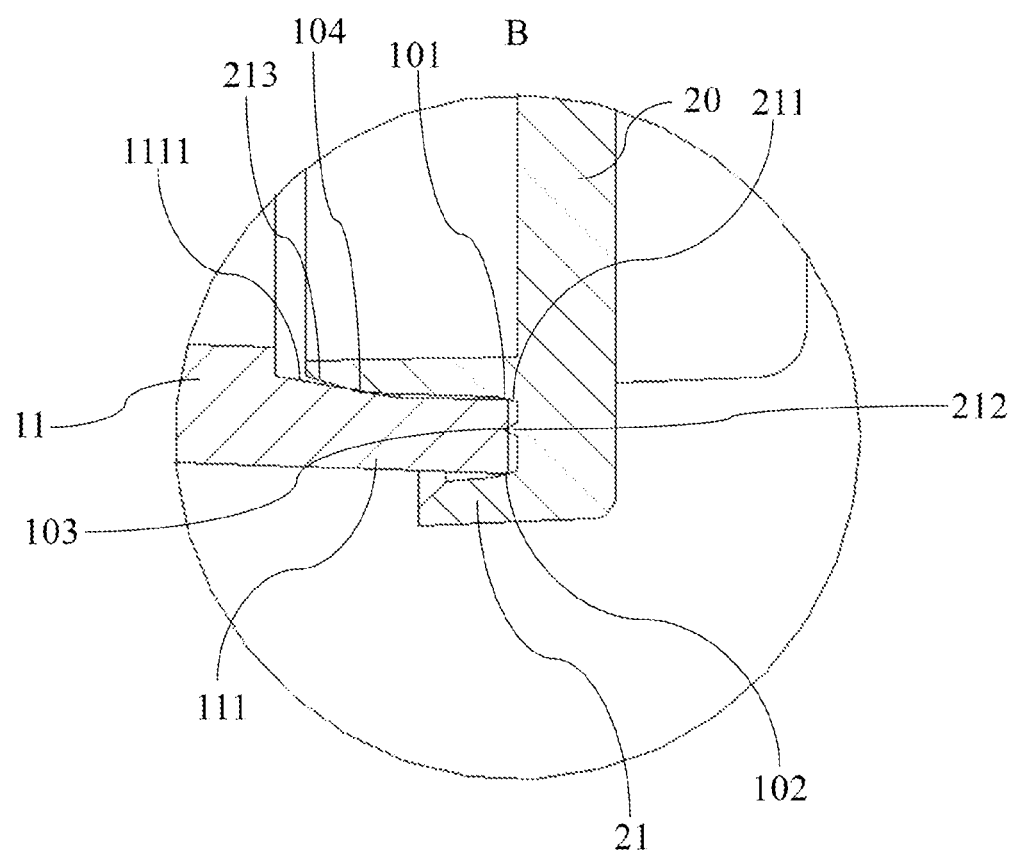
FIG. 5 is a schematic enlarged view of a portion B in FIG. 4.

100: dispenser;
101: first sealing surface, 102: second sealing surface, 103: third sealing surface, 104: fourth sealing surface;
10: base;
11: water storing part, 111: insertion part, 1111: first inclined surface, 112: spray chamber, 1121: water outlet hole, 113: first flow channel, 1131: first water inlet section, 1132: first water outlet section, 114: second flow channel, 1141: second water inlet section, 1142: second water outlet section, 115: third flow channel, 12: receiving tray, 121: water leakage hole, 13: threaded hole, 14: through hole;
20: cover plate;
21: fitting slot, 211: narrowed section, 212: protrusion, 213: second inclined surface;
30: fastener;
40: snap assembly, 41: snap, 42: catch;
50: first water inlet joint;
60: second water inlet joint;
70: first water outlet joint;
80: second water outlet joint;
90: hot water pipe joint;
200: water inlet system;
210: first control valve, 220: second control valve, 230: first detergent dispenser, 240: second detergent dispenser, 260: first hose, 270: second hose, 280: third control valve.

DETAILED DESCRIPTION OF THE DISCLOSURE

Exemplary embodiments of the present disclosure will be described in more detail below with reference to the accompanying drawings. Although the exemplary implementations of the present disclosure are shown in the accompanying drawings, it should be understood that the present disclosure can be implemented in various forms and should not be limited by the embodiments illustrated herein. These embodiments are provided to enable the present disclosure to be understood more thoroughly and to completely convey the scope of the present disclosure.

It should be understood that the terms used herein are intended only to describe some embodiments and are not limitation of the present disclosure. Unless the context clearly indicates otherwise, the singular forms "a/an", "one", and "the/said" used herein may also indicate the plural forms. The terms "comprise", "include", "contain" and "have" are inclusive, and thus indicate the presence of the features, steps, operations, elements, and/or components described, and they are not intended to (and do not) exclude the presence or addition of one or more other features, steps, operations, elements, components and/or groups thereof. The method steps, processes and operations described herein are not interpreted that they must be performed in the specific order as described or illustrated, unless the order is explicitly stated. It should also be understood that additional or alternative steps may be used.

Although the terms "first", "second", "third" and so on may be used to describe various elements, components, regions, layers, and/or sections, these elements, components, regions, layers, and/or sections should not be limited by these terms. These terms are used merely to distinguish an element, component, region, layer, or section from another element, component, region, layer, or section. Unless otherwise indicated herein, terms such as "first" and "second" and other numerical terms do not imply order or sequence when used herein. Therefore, the first element, component, region, layer or section discussed below may be represented as a second element, component, region, layer or section without departing from the teaching of the exemplary implementations.

For the convenience of description, spatial relative relation terms, such as "inner", "outer", "inside", "outside", "below", "under", "on", "above", may be used herein to describe a relationship of one element or feature and another element or feature as shown in the figures. The spatial relative relation terms include different orientations of the devices in use and operation other than the orientations shown in the figures. For example, if the device in the drawings is turned upside down, then elements described as "under", or "below" other elements or features will be oriented to be "on" or "above" other elements or features. Therefore, the exemplary terms "under" may include both upper and lower orientations. The device may be otherwise oriented (rotated by 90 degrees or other orientations) and the spatial relative relation terms used herein are interpreted accordingly.

As shown in FIG. 1 to FIG. 5, an embodiment of the present disclosure proposes a dispenser 100. The dispenser 100 includes a base 10, a cover plate 20 and a fastener 30. In one embodiment, the base 10 includes a water storing part 11 configured to define a water flow boundary. An insertion part 111 is formed at an upper end of the water storing part 11. A fitting slot 21 is formed on the cover plate 20. The insertion part 111 is limited in the fitting slot 21. The fastener 30 fastens the cover plate 20 to the base 10, to enable sealing surfaces to be formed between the insertion part 111 and the fitting slot 21, the sealing surfaces being in close contact with each other.

According to the dispenser 100 in the embodiment of the present disclosure, the base 10 of the dispenser is connected to the cover plate 20 of the dispenser through the fastener 30, and the water storing part 11 on the base 10 is configured to define the water flow boundary. In a case that the base 10 is connected to the cover plate 20, the water storing part 11 and the cover plate 20 collectively define a water flow channel. Meanwhile, under the fastening action of the fastener 30, the insertion part 111 formed at the upper end of the water storing part 11 fits tightly into the fitting slot 21 formed on the cover plate 20, and sealing surfaces, which are in close contact with each other, are formed between the insertion part and the fitting slot, to guarantee the sealing performance of the water flow channel. Since the base 10 is connected to the cover plate 20 by means of locking through the fastener 30, and meanwhile the channel is sealed, the cost can be reduced, and the production efficiency is relatively high compared to the welding method used in the related art.

In some embodiments of the present disclosure, the fastener 30 is a screw. Correspondingly, the base 10 may be provided with a threaded hole 13, and the cover plate 20 may be provided with a through hole 14. The screw passes through the through hole 14, and then is screwed into the threaded hole 13, and to fasten the cover plate 20 to the base 10. In some other embodiments of the present disclosure, the fastener 30 is a pin, which may be pinned through the cover plate 20 into the base 10, and to fasten the cover plate 20 to the base 10.

In some embodiments of the present disclosure, the dispenser 100 further includes a snap assembly 40 arranged between the base 10 and the cover plate 20. During connection of the cover plate 20 with the base 10 through the fastener 30, the snap assembly is brought into a snapped state. In one embodiment, the snap assembly 40 may include a snap 41 and a catch 42. The snap 41 is arranged on one of the base 10 and the cover plate 20, and the catch 42 is arranged on the other of the base 10 and the cover plate 20. In this embodiment, the snap assembly 40 is provided on the dispenser 100, and the snap assembly 40 may also fasten the base 10 to the cover plate 20. In a case that the snap assembly 40 is provided, the number of fasteners 30 may be reduced. Since the snap assembly 40 may be brought into the snapped state automatically during connection of the fastener 30, that is, no additional operation is required to bring the snap assembly 40 into the snapped state, the reduction of the number of the fasteners 30 may reduce the operation actions during the assembly of the cover plate 20 and the base 10, which facilitates further improving the production efficiency.

In some embodiments of the present disclosure, a bottom portion of the fitting slot 21 is provided with a narrowed section 211. Under a fastening action of the fastener 30, an end of the insertion part 111 abuts tightly against inner walls of the narrowed section 211 to form a first sealing surface 101 and a second sealing surface 102. In this embodiment, since the bottom portion of the fitting slot 21 is provided with the narrowed section 211, the bottom portion of the fitting slot 21 has a narrowing tendency in which a cross-sectional area of the bottom portion of the fitting slot 21 is gradually reduced. Thus, during the connection of the cover plate 20 with the base 10 through the fastener 30, with gradually locking of the fastener 30, two edges of the end of the insertion part 111 and two inner walls of the narrowed section 211 press against each other, and to enable the first sealing surface 101 and the second sealing surface 102 to be formed between the end of the insertion part 111 and the inner walls of the narrowed section 211. The two sealing surfaces may provide a good sealing function on the water flow channel.

Further, a protrusion 212 is formed at the bottom portion of the fitting slot 21. Under the fastening action of the fastener 30, the end of the insertion part 111 abuts tightly against the protrusion 212, to form a third sealing surface 103. In this embodiment, the protrusion 212 is formed at the bottom portion of the fitting slot 21. During the connection of the cover plate 20 with the base 10 through the fastener 30, with gradually locking of the fastener 30, the protrusion 212 and the end of the insertion part 111 press against each other, and to enable the third sealing surface 103 to be formed between the end of the insertion part 111 and the protrusion 212. Thus, the sealing performance of the water flow channel may be further improved, and the channel may be subjected to higher water pressure.

Further, a first inclined surface 1111 is formed on the insertion part 111, and a second inclined surface 213 is formed on an inner wall of the fitting slot 21. Under the fastening action of the fastener 30, the first inclined surface 1111 abuts tightly against the second inclined surface 213, and to form a fourth sealing surface 104. In this embodiment, the first inclined surface 1111 is formed on the insertion part 111, and the second inclined surface 213 is formed on the inner wall of the fitting slot 21. Thus, during the connection of the cover plate 20 with the base 10 through the fastener 30, with gradually locking of the fastener 30, the first inclined surface 1111 and the second inclined surface 213 press against each other, and to form the fourth sealing surface 104 between the insertion part 111 and the inner wall of the fitting slot 211. Thus, the sealing performance of the water flow channel may be further improved, and the channel may be subjected to higher water pressure.

Further, the base 10 and the cover plate 20 are both plastic components, and the base 10 and the cover plate 20 both have a level of deformability. Thus, during the connection of the cover plate 20 with the base 10 through the fastener 30, several contact portions of the insertion part 111 with the fitting slot 21 press against each other to be deformed to a certain extent, and the contact portions of the insertion part 111 with the fitting slot 21 are attached to each other more tightly, to form the sealing surfaces with good sealing performance.

In some embodiments of the present disclosure, the water storing part 11 includes a flow channel assembly, and a spray chamber 112 connected to the flow channel assembly. Water outlet holes 1121 are formed at a bottom part of the spray chamber 112. In a case that the base 10 is connected to the cover plate 20, the spray chamber 112 and the cover plate 20 form a spray box. The spray box is configured to allow the tap water to be sprayed into the washing drum of the laundry treating device. Spraying the water provides an advantage that the laundry placed in the washing drum may be wetted thoroughly and more evenly before the laundry is washed. In addition, during rinsing of the laundry in the laundry treating device, the laundry may be rinsed in a spray manner, which may not only save water, but also achieve better rinsing effects.

Figure 6:
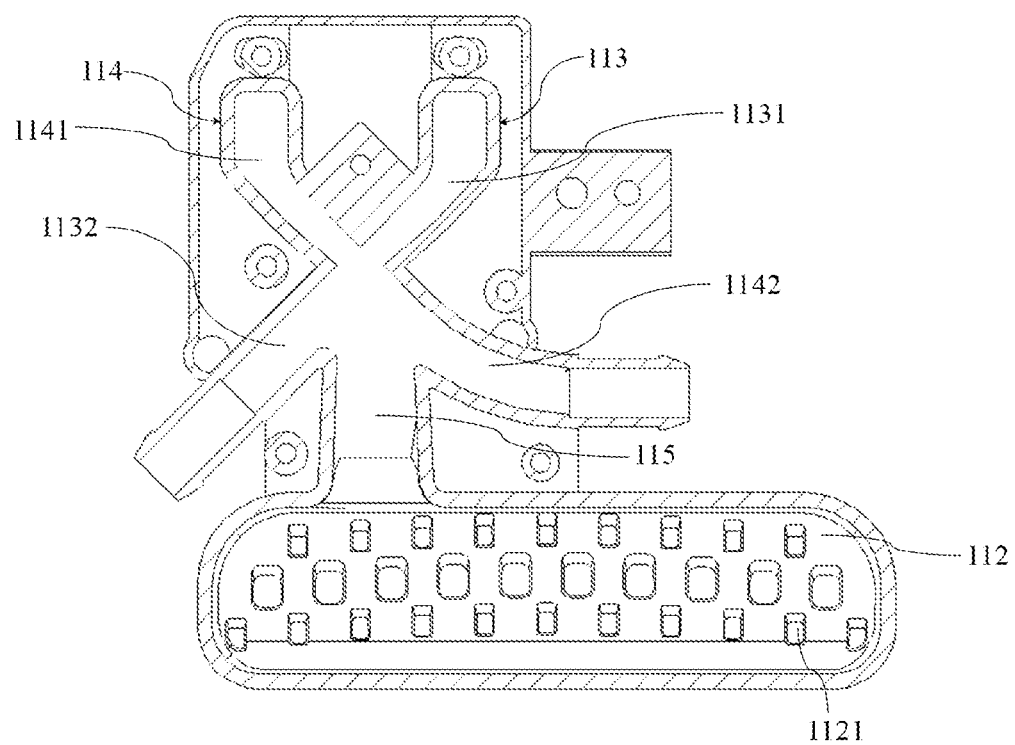
FIG. 6 is a schematic view of an inner structure of a dispenser according to an embodiment of the present disclosure.
Figure 7:
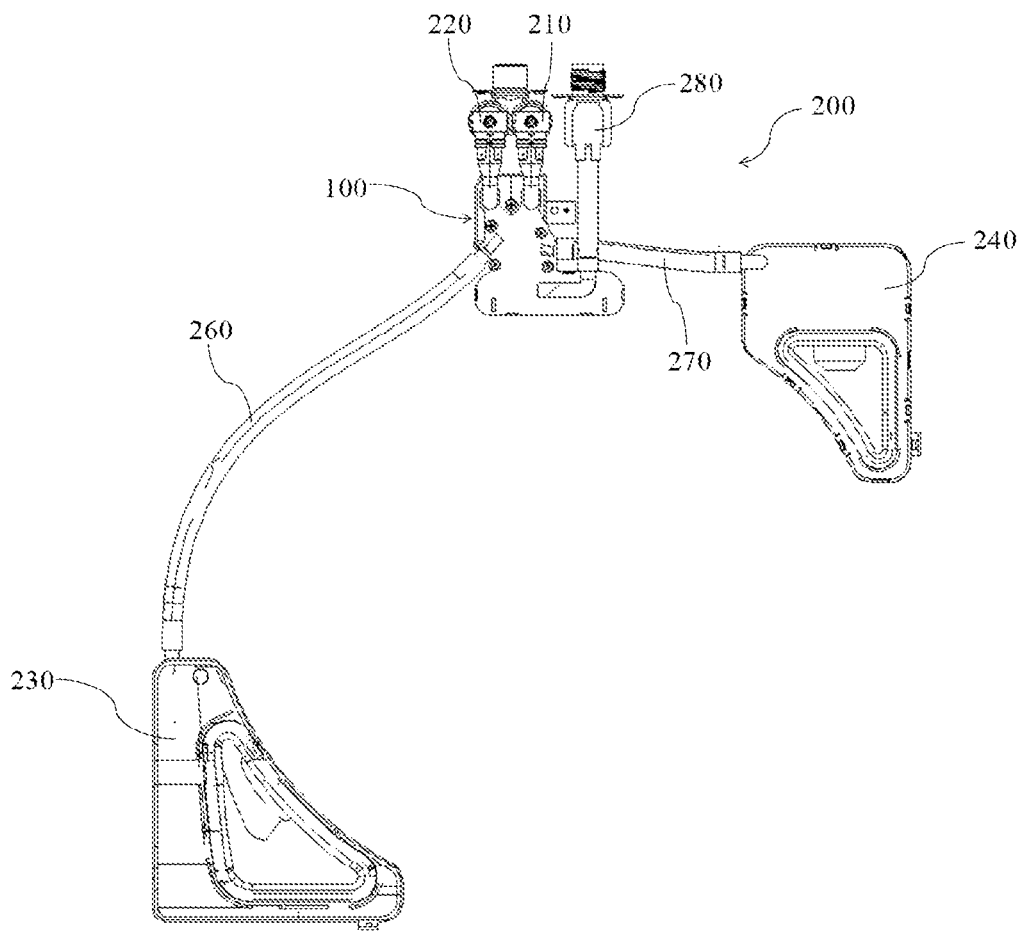
FIG. 7 is a schematic view of a water inlet system according to an embodiment of the present disclosure.

In some embodiments of the present disclosure, as shown in FIG. 6 and FIG. 7, the flow channel assembly includes an X-shaped flow channel. The X-shaped flow channel includes a first flow channel 113 and a second flow channel 114 intersecting with the first flow channel. The first flow channel 113 includes a first water inlet section 1131 and a first water outlet section 1132, and the second flow channel 114 includes a second water inlet section 1141 and a second water outlet section 1142. The flow channel assembly further includes a third flow channel 115. The third flow channel 115 is arranged between the first water outlet section 1132 and the second water outlet section 1142. The third flow channel 115 is in communication with the X-shaped flow channel. An inlet of the third flow channel 115 is arranged at the intersection of the first flow channel 113 with the second flow channel 114. The spray chamber 112 is in communication with the third flow channel 115. When the dispenser 100 is applied to the water inlet system of the laundry treating device, each of the first flow channel 113 and the second flow channel 114 of the X-shaped flow channel may be connected to a respective one of the detergent dispensers, and a control valve may be installed at each of the inlets of the first flow channel 113 and the second flow channel 114. For example, the first flow channel 113 is connected to a first detergent dispenser 230, and the second flow channel 114 is connected to a second detergent dispenser 240. The first detergent dispenser 230 and the second detergent dispenser 240 are configured to receive different washing agents (for example, detergent, softener, etc.). Meanwhile, a first control valve 210 is installed at the inlet of the first flow channel 113, and a second control valve 220 is installed at the inlet of the second flow channel 114.

In the process of introducing water into the laundry treating device, in a case that only the first control valve 210 is opened, the tap water enters into the first flow channel 113 through the first control valve 210. When the water flow reaches the intersection of the X-shaped flow channel along the first flow channel 113, most part of the water flow will flow in its original flow direction and enter the first water outlet section 1132, and another part of the water flow will enter into the third flow channel 115. As such, most part of the water flow will enter the first detergent dispenser 230, to flush the washing agent in the first detergent dispenser 230 into the washing drum of the laundry treating device. Meanwhile, another part of the water flow will enter into the spray chamber 112, and is eventually sprayed by the spray chamber 112 into the washing drum. Similarly, in a case that only the second control valve 220 is opened, the tap water enters into the second flow channel 114 through the second control valve 220. Most part of the water flow will eventually enter into the second detergent dispenser 240 through the second water outlet section 1142 to flush the washing agent in the second detergent dispenser 240 into the washing drum, and another part of the water flow will be sprayed via the spray chamber 112 into the washing drum. Moreover, in a case that the first control valve 210 and the second control valve 220 are simultaneously opened, the tap water simultaneously enters into the first flow channel 113 and the second flow channel 114. After these two water flows are conflated at the intersection of the X-shaped flow channel, they enter into the spray chamber 112 and are eventually sprayed into the washing drum.

It can be seen that with two control valves, i.e., the first control valve 210 and the second control valve 220, a variety of water inlet modes, such as flush of the first detergent dispenser 230, flush of the second detergent dispenser 240, spraying of the water, etc., can be achieved. Compared with the existing water inlet system, fewer control valves are used, and the structure is simplified, and the cost is reduced.

It can be understood that the first detergent dispenser 230 and the second detergent dispenser 240 are configured to receive different washing agents. In a common implementation, the first detergent dispenser 230 is configured to receive detergent or washing power, and the second detergent dispenser 240 is configured to receive softener. During rinsing of the laundry, addition of the softener can reduce the coefficient of friction between the fibers, and restore the inherent smoothness, extension and compression properties of the fibers, allowing the laundry to become soft, fluffy and elastic.

In some embodiments of the present disclosure, the dispenser 100 further includes a first water inlet joint 50 and a second water inlet joint 60. The first water inlet joint 50 is arranged at an inlet of the first flow channel 113, and the second water inlet joint 60 is arranged at an inlet of the second flow channel 114. The first water inlet joint 50 is configured to connect the inlet end of the first flow channel 113 to an external pipeline. For example, in a specific example, the first control valve 210 is connected to the first water inlet joint 50, to achieve the connection between the first control valve 210 and the inlet of the first flow channel 113, to enable the first control valve 210 to control the opening and closing of the first flow channel 113. Similarly, the second water inlet joint 60 is configured to connect the inlet end of the second flow channel 114 to an external pipeline. In one embodiment, the second control valve 220 is connected to the second water inlet joint 60, to achieve the connection between the second control valve 220 and the inlet of the second flow channel 114, to enable the second control valve 220 to control the opening and closing of the second flow channel 114.

In one embodiment, the inlet ends of the first water inlet joint 50 and the second water inlet joint 60 may be provided with internal threads or external threads, and the first water inlet joint 50 and the second water inlet joint 60 may be connected to the external pipeline by means of threaded connection. Such a connection method is easier to operate, and facilitates improvement of the assembly efficiency.

It can be understood that the first water inlet joint 50 and the second water inlet joint 60 may be arranged on the base 10, or may be arranged on the cover plate 20. The specific positions thereof may be selected according to actual needs.

In some embodiments of the present disclosure, the dispenser 100 further includes a first water outlet joint 70 and a second water outlet joint 80. The first water outlet joint 70 is arranged at an outlet of the first flow channel 113, and the second water outlet joint 80 is arranged at an outlet of the second flow channel 114. The first water outlet joint 70 is configured to connect the outlet end of the first flow channel 113 and an external pipeline. In one embodiment, the first water outlet joint 70 is connected to a hose in communication with the first detergent dispenser 230, and the connection between the first flow channel 113 and the first detergent dispenser 230 can be achieved. Similarly, the second water outlet joint 80 is configured to connect the outlet end of the second flow channel 114 to an external pipeline. In one embodiment, the second water outlet joint 80 is connected to a hose in communication with the second detergent dispenser 240, and the connection between the second flow channel 114 and the second detergent dispenser 240 can be achieved.

In one embodiment, the outlet ends of the first water outlet joint 70 and the second water outlet joint 80 may be provided with internal threads or external threads, and the first water outlet joint 70 and the second water outlet joint 80 may be connected to the external pipeline by means of threaded connection. Such a connection method is easier to operate, and facilitates improvement of the assembly efficiency.

It can be understood that the first water outlet joint 70 and the second water outlet joint 80 may be arranged on the base 10, or may be arranged on the cover plate 20. The specific positions thereof may be selected according to actual needs.

In some embodiments of the present disclosure, the dispenser 100 further includes a hot water pipe joint 90 arranged on the cover plate 20. The hot water pipe joint 90 is in communication with the spray chamber 112. The hot water pipe joint 90 may be connected to an external hot water source via a water pipe, and the hot water can be introduced into the laundry treating device, and the water path for the hot water and the water path for the tap water (cold water) are independent of each other. In one embodiment, when the hot water is introduced, the hot water supplied by the external hot water source directly enters into the spray chamber 112 via the hot water pipe joint 90, and then is sprayed into the washing drum of the laundry treating device. In this embodiment, the hot water may be introduced into the laundry treating device. By controlling the ratio of the hot water to the tap water entering into the washing drum, the temperature of the washing water may be adjusted, to allow the temperature of the washing water to be in a better temperature range, to improve the cleaning effect on the laundry.

In some embodiments of the present disclosure, the base 10 further includes a receiving tray 12. The receiving tray 12 is arranged around the flow channel assembly. The receiving tray 12 is provided with water leakage holes 121. In a case of water leakage from the flow channel assembly due to poor sealing or excessive water pressure, the receiving tray 12 may be used to receive the water leaked from the flow channel assembly, to avoid the leaked water from scattering onto other components of the laundry treating device, which adversely affect the other components. In addition, the water leakage holes on the receiving tray 12 may be further connected to a guide structure (for example, a water pipe, a drainage trough, etc.). The guide structure is in communication with the washing drum of the laundry treating device, to enable the water in the receiving tray 12 to be further guided into the washing drum.

Further, when the dispenser 100 is installed in the laundry treating device, the receiving tray 12 may be arranged at an angle to the horizontal plane, that is, the receiving tray 12 may be slightly inclined. In addition, the water leakage holes 121 are arranged at a low level. In this way, this facilitates allowing the water in the receiving tray 12 to be collected towards the water leakage holes 121, and eventually flow into the washing drum of the laundry treating device via the water leakage holes 121 and the guide structure.

An embodiment of the present disclosure proposes a water inlet system 200. The water inlet system 200 includes the dispenser 100 in any one of the above embodiments.

According to the water inlet system 200 in the embodiment of the present disclosure, the base 10 of the dispenser 100 of the water inlet system is connected to the cover plate 20 of the dispenser 100 of the water inlet system through the fastener 30, and the water storing part 11 on the base 10 is configured to define the water flow boundary. In a case that the base 10 is connected to the cover plate 20, the water storing part 11 and the cover plate 20 collectively define a water flow channel. Meanwhile, under the fastening action of the fastener 30, the insertion part 111 formed at the upper end of the water storing part 11 fits tightly into the fitting slot 21 formed on the cover plate 20, and sealing surfaces, which are in close contact with each other, are formed between the insertion part and the fitting slot, to guarantee the sealing performance of the water flow channel. Since the base 10 is connected to the cover plate 20 by means of locking through the fastener 30, and meanwhile the channel is sealed, the cost can be reduced, and the production efficiency is relatively high compared to the welding method used in the related art.

In some embodiments of the present disclosure, the flow channel assembly includes an X-shaped flow channel. The X-shaped flow channel includes a first flow channel 113 and a second flow channel 114 intersecting with the first flow channel. The first flow channel 113 includes a first water inlet section 1131 and a first water outlet section 1132, and the second flow channel 114 includes a second water inlet section 1141 and a second water outlet section 1142. The flow channel assembly further includes a third flow channel 115. The third flow channel 115 is arranged between the first water outlet section 1132 and the second water outlet section 1142. The third flow channel 115 is in communication with the X-shaped flow channel. An inlet of the third flow channel 115 is arranged at the intersection of the first flow channel 113 with the second flow channel 114. The spray chamber 112 is in communication with the third flow channel 115. The water inlet system 200 further includes a first control valve 210, a second control valve 220, a first detergent dispenser 230 and a second detergent dispenser 240. The first control valve 210 is installed at the inlet of the first flow channel 113, and the second control valve 220 is installed at the inlet of the second flow channel 114. The first detergent dispenser 230 is connected to the first flow channel 113, and the second detergent dispenser 240 is connected to the second flow channel 114.

In this embodiment, the first flow channel 113 in the X-shaped flow channel is connected to the first detergent dispenser 230, and the second flow channel 114 is connected to the second detergent dispenser 240. The first detergent dispenser 230 and the second detergent dispenser 240 are configured to receive different washing agents (for example, detergent, softener, etc.). Meanwhile, the first control valve 210 is installed at the inlet of the first flow channel 113, and the second control valve 220 is installed at the inlet of the second flow channel 114. In the process of introducing water into the laundry treating device, in a case that only the first control valve 210 is opened, the tap water enters into the first flow channel 113 through the first control valve 210. When the water flow reaches the intersection of the X-shaped flow channel along the first flow channel 113, most part of the water flow will flow in its original flow direction and enter the first water outlet section 1132, and another part of the water flow will enter into the third flow channel 115. As such, most part of the water flow will enter the first detergent dispenser 230, to flush the washing agent in the first detergent dispenser 230 into the washing drum of the laundry treating device. Meanwhile, another part of the water flow will enter into the spray chamber 112, and is eventually sprayed by the spray chamber 112 into the washing drum. Similarly, in a case that only the second control valve 220 is opened, the tap water enters into the second flow channel 114 through the second control valve 220. Most part of the water flow will eventually enter into the second detergent dispenser 240 through the second water outlet section 1142 to flush the washing agent in the second detergent dispenser 240 into the washing drum, and another part of the water flow will be sprayed via the spray chamber 112 into the washing drum. Moreover, in a case that the first control valve 210 and the second control valve 220 are simultaneously opened, the tap water simultaneously enters into the first flow channel 113 and the second flow channel 114. After these two water flows are conflated at the intersection of the X-shaped flow channel, they enter into the spray chamber 112 and are eventually sprayed into the washing drum. It can be seen that with two control valves, i.e., the first control valve 210 and the second control valve 220, a variety of water inlet modes, such as flush of the first detergent dispenser 230, flush of the second detergent dispenser 240, spraying of the water, etc., can be achieved. Compared with the existing water inlet system, fewer control valves are used, and the structure is simplified, and the cost is reduced.

In some embodiments of the present disclosure, the water inlet system 200 further includes a first hose 260 and a second hose 270. An end of the first hose 260 is connected to the outlet of the first flow channel 113, and another end of the first hose 260 is connected to the first detergent dispenser 230. An end of the second hose 270 is connected to the outlet of the second flow channel 114, and another end of the second hose 270 is connected to the second detergent dispenser 240. In this embodiment, the first detergent dispenser 230 is connected to the first flow channel 113 through the first hose 260, and the second detergent dispenser 240 is connected to the second flow channel 114 through the second hose 270. In this way, the first detergent dispenser 230 and the second detergent dispenser 240 may be arranged at suitable positions in the laundry treating device according to design needs, without being limited to positions adjacent to the dispenser 100, to provide a larger design freedom for the structural design of the laundry treating device. In addition, the first hose 260 and the second hose 270 are provided in such a way that the flow path of the water flow becomes longer, and the water flow flowing towards the first detergent dispenser 230 or the second detergent dispenser 240 is subjected to greater resistance. In this way, this facilitates allowing the water flow flowing towards the first detergent dispenser 230 or the second detergent dispenser 240 to be partly diverted at the intersection of the X-shaped flow channel 20 to the third flow channel 30, and to ensure that the water flow enters into the washing drum of the laundry treating device through the spray box 40 in all water inflow modes, to maintain the effect of spraying water on the laundry.

In some embodiments of the present disclosure, the water inlet system 200 further includes a third control valve 280. The dispenser 100 further includes a hot water pipe joint 90 arranged on the spray box 40. The hot water pipe joint 90 is connected to an inlet of the third control valve 280. In this embodiment, the water inlet system 200 may further introduce the hot water into the laundry treating device through the third control valve 280 and the hot water pipe joint 90. In one embodiment, the third control valve 280 is configured to control the opening and closing of the water path for the hot water. In a case that the third control valve 280 is opened, the hot water supplied by the external hot water source sequentially passes through the third control valve 280 and the hot water pipe joint 90, and then enters into the spray chamber 112, and then is sprayed into the washing drum of the laundry treating device. In the water inlet system 200 in this embodiment, by controlling the ratio of the hot water to the tap water entering into the washing drum, the temperature of the washing water may be adjusted, to allow the temperature of the washing water to be in a better temperature range, to improve the cleaning effect on the laundry.

An embodiment of the present disclosure proposes a laundry treating device (such as a washing machine, a washing and drying machine, etc.), which includes the water inlet system in any one of the above embodiments.

According to the laundry treating device in the embodiment of the present disclosure, the water inlet system of the laundry treating device includes a dispenser 100. The base 10 of the dispenser 100 is connected to the cover plate 20 of the dispenser 100 through the fastener 30, and the water storing part 11 on the base 10 is configured to define the water flow boundary. In a case that the base 10 is connected to the cover plate 20, the water storing part 11 and the cover plate 20 collectively define a water flow channel. Meanwhile, under the fastening action of the fastener 30, the insertion part 111 formed at the upper end of the water storing part 11 fits tightly into the fitting slot 21 formed on the cover plate 20, and sealing surfaces, which are in close contact with each other, are formed between the insertion part and the fitting slot, to guarantee the sealing performance of the water flow channel. Since the base 10 is connected to the cover plate 20 by means of locking through the fastener 30, and meanwhile the channel is sealed, the cost can be reduced, and the production efficiency is relatively high compared to the welding method used in the related art.

What is claimed is:

1. A dispenser, comprising:
   a base, wherein the base comprises a water storing part configured to define a water flow boundary, an insertion part being formed at an upper end of the water storing part;
   a cover plate, wherein a fitting slot is formed on the cover plate, the insertion part being limited in the fitting slot; and
   a fastener, wherein the fastener fastens the cover plate to the base, and wherein a plurality of sealing surfaces are formed between the insertion part and the fitting slot, the plurality of sealing surfaces being in close contact with each other;
   wherein a bottom portion of the fitting slot is provided with a narrowed section, wherein under a fastening action of the fastener, an end of the insertion part abuts tightly against inner walls of the narrowed section to form a first sealing surface and a second sealing surface, and the second sealing surface is parallel and opposite to the first sealing surface.

2. The dispenser according to claim 1, wherein a protrusion is formed at the bottom portion of the fitting slot, wherein under the fastening action of the fastener, the end of the insertion part abuts tightly against the protrusion to form a third sealing surface, and a plane of the third sealing surface is perpendicular to planes of the first and the second sealing surfaces respectively.

3. The dispenser according to claim 2, wherein a first inclined surface is formed on the insertion part, and a second inclined surface is formed on an inner wall of the fitting slot, wherein under the fastening action of the fastener, the first inclined surface abuts tightly against the second inclined surface to form a fourth sealing surface.

4. The dispenser according to claim 1, wherein the water storing part comprises a flow channel assembly, and a spray chamber connected to the flow channel assembly, wherein a plurality of water outlet holes are formed at a bottom part of the spray chamber.

5. The dispenser according to claim 4, wherein the flow channel assembly comprises:
   an X-shaped flow channel, wherein the X-shaped flow channel comprises a first flow channel and a second flow channel intersecting with the first flow channel, wherein the first flow channel comprises a first water inlet section and a first water outlet section, and the second flow channel comprises a second water inlet section and a second water outlet section; and
   a third flow channel, wherein the third flow channel is arranged between the first water outlet section and the second water outlet section, the third flow channel is in communication with the X-shaped flow channel, an inlet of the third flow channel is arranged at an intersection of the first flow channel with the second flow channel, and the spray chamber is in communication with the third flow channel.

6. The dispenser according to claim 5, further comprising:
   a first water inlet joint arranged at an inlet of the first flow channel;
   a second water inlet joint arranged at an inlet of the second flow channel;
   a first water outlet joint arranged at an outlet of the first flow channel; and
   a second water outlet joint arranged at an outlet of the second flow channel.

7. The dispenser according to claim 5, wherein the dispenser further comprises a hot water pipe joint arranged on the cover plate, wherein the hot water pipe joint is in communication with the spray chamber.

8. The dispenser according to claim 4, wherein the base further comprises a receiving tray, wherein the receiving tray is arranged around the flow channel assembly, and the receiving tray is provided with a plurality of water leakage holes.

9. The dispenser according to claim 1, wherein the dispenser further comprises a snap assembly arranged between the base and the cover plate.

10. A water inlet system, comprising:
   a dispenser, comprising:
   a base, wherein the base comprises a water storing part configured to define a water flow boundary, an insertion part being formed at an upper end of the water storing part;
   a cover plate, wherein a fitting slot is formed on the cover plate, the insertion part being limited in the fitting slot; and
   a fastener, wherein the fastener fastens the cover plate to the base to enable a plurality of sealing surfaces to be formed between the insertion part and the fitting slot, the plurality of sealing surfaces being in close contact with each other;
   wherein a bottom portion of the fitting slot is provided with a narrowed section, wherein under a fastening action of the fastener, an end of the insertion part abuts tightly against inner walls of the narrowed section to form a first sealing surface and a second sealing surface, and the second sealing surface is parallel and opposite to the first sealing surface.

11. A laundry treating device, comprising:
   a water inlet system, comprising:
   a dispenser, comprising:
   a base, wherein the base comprises a water storing part configured to define a water flow boundary, an insertion part being formed at an upper end of the water storing part;
   a cover plate, wherein a fitting slot is formed on the cover plate, the insertion part being limited in the fitting slot; and
   a fastener, wherein the fastener fastens the cover plate to the base to enable a plurality of sealing surfaces to be formed between the insertion part and the fitting slot, the plurality of sealing surfaces being in close contact with each other;
   wherein a bottom portion of the fitting slot is provided with a narrowed section, wherein under a fastening action of the fastener, an end of the insertion part abuts tightly against inner walls of the narrowed section to form a first sealing surface and a second sealing surface, and the second sealing surface is parallel and opposite to the first sealing surface.

* * * * *